(12) United States Patent
Bhowmik

(10) Patent No.: US 7,314,282 B2
(45) Date of Patent: Jan. 1, 2008

(54) COLOR-SPLIT OPTICAL ENGINE ARCHITECTURE FOR PROJECTION DISPLAYS

(75) Inventor: Achintya K. Bhowmik, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 11/042,756

(22) Filed: Jan. 25, 2005

(65) Prior Publication Data

US 2006/0164606 A1 Jul. 27, 2006

(51) Int. Cl.
*G02B 5/26* (2006.01)
*G03B 21/14* (2006.01)

(52) U.S. Cl. .............................. 353/84; 353/31; 359/891
(58) Field of Classification Search ................... 353/31, 353/28, 84, 119, 121; 359/889–892; 348/771, 348/759–761, 742, 743; G02B 5/26
See application file for complete search history.

(56) References Cited

U.S. PATENT DOCUMENTS

| 5,863,125 | A | * | 1/1999 | Doany ........................ 353/84 |
| 5,921,650 | A | * | 7/1999 | Doany et al. .................. 353/31 |
| 7,006,163 | B2 | * | 2/2006 | Yamamoto et al. ......... 348/742 |
| 7,006,310 | B2 | * | 2/2006 | Karube et al. .............. 359/891 |
| 7,066,605 | B2 | * | 6/2006 | Dewald et al. ............... 353/84 |
| 2003/0197834 | A1 | * | 10/2003 | Kang .......................... 353/31 |
| 2005/0018145 | A1 | * | 1/2005 | Kwon et al. .................. 353/84 |

OTHER PUBLICATIONS

RADIAL Definition, Sep. 24, 2007, hyperdictionary, http://www.hyperdictionary.com/search.aspx?define=radial.*
INWARDLY Definition, Sep. 24, 2007, hyperdictionary, http://www.hyperdictionary.com/search.aspx?define=inwardly.*

* cited by examiner

*Primary Examiner*—Andrew T Sever
(74) *Attorney, Agent, or Firm*—Trop, Pruner & Hu, P.C.

(57) ABSTRACT

A projection display may use a color wheel having radially displaced regions of different colors. As a result, at any instance of time on a spatial light modulator in a projection display, three vertically displaced segments may be utilized, each of which is exposed to a different color at any instant of time. Over time, each of the vertically displaced segments may be exposed successively to each of the three primary colors. At any instance of time, the spatial light modulator has an upper region exposed to one color, an intermediate region exposed to another color, and a lower region exposed to still another color. As a result, relatively little light is lost, which may enable brighter reduced-panel display systems using lower power light sources.

32 Claims, 2 Drawing Sheets

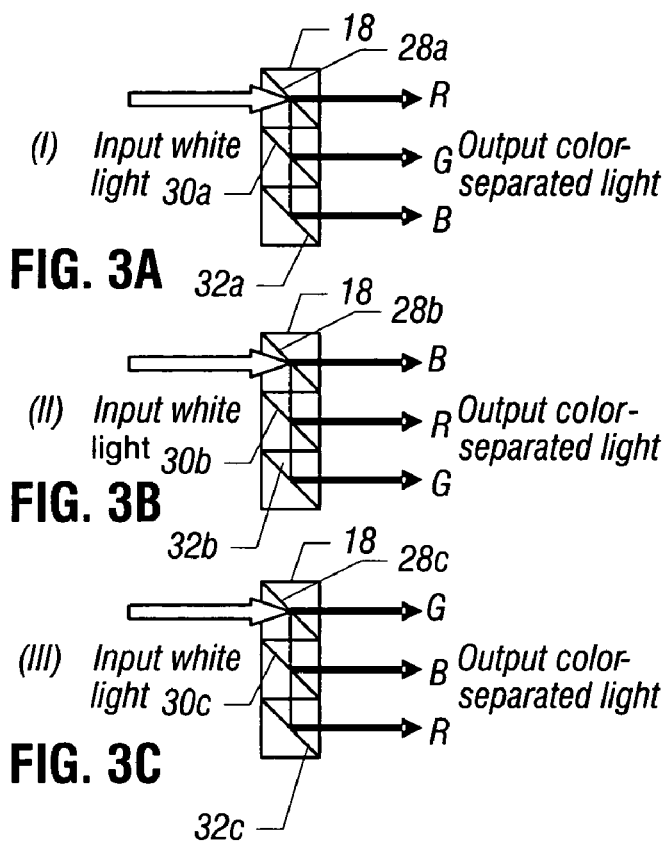
FIG. 3A
FIG. 3B
FIG. 3C
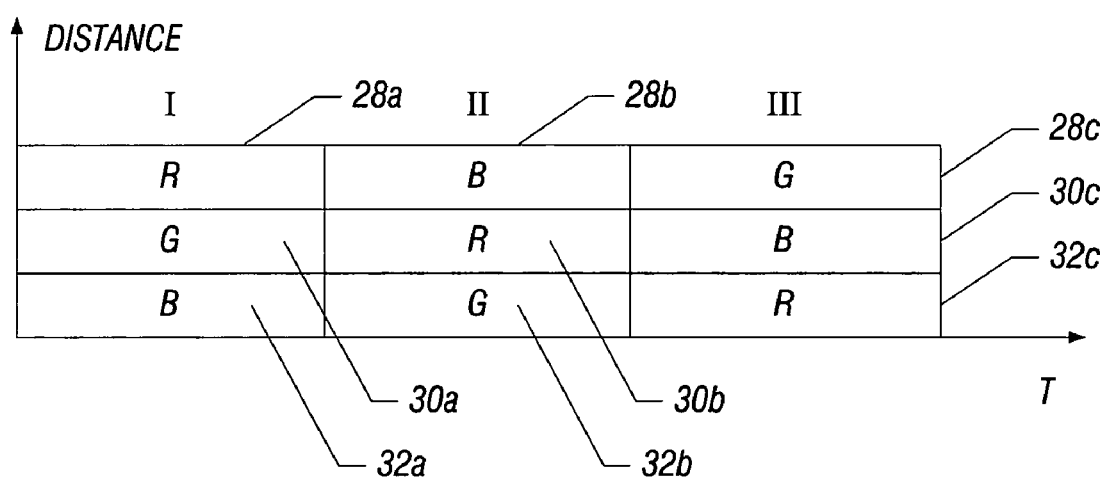
FIG. 4

COLOR-SPLIT OPTICAL ENGINE ARCHITECTURE FOR PROJECTION DISPLAYS

BACKGROUND

This invention relates generally to projection displays.

A projection display typically includes one or more spatial light modulators that modulate light to produce a projected image. The spatial light modulator may include, for example, a liquid crystal display such as a high temperature polysilicon (HTPS) liquid crystal display panel or a liquid crystal-on-silicon microdisplay, a grating light valve, or a microelectromechanical device light modulator such as a digital mirror display to modulate light that originates from a lamp of the projection display system. In typical projection displays, the light output is formatted with optics to deliver a uniform level on a surface of the spatial light modulator. The spatial light modulator forms a pictorial image by modulating the illumination into spatially distinct tones ranging from dark to bright, based on the supplied video data. Additional optics then relay and magnify the modulated illumination pattern onto a screen for viewing.

The spatial light modulator typically includes an array of pixel cells, which are electrically controllable to establish the intensity of a pixel of the projected image. In some projection displays, spatial light modulators are transmissive and in others they are reflective. In a digital drive scheme, a spatial light modulator may be operated so that each pixel has only two states. A default reflective state causes either a bright or a dark projected pixel and a non-default reflective state causes the opposite projected pixel intensity. In the case of a liquid crystal-on-silicon spatial light modulator, the pre-alignment orientation of the liquid crystal material and any retarders in the system determine whether the default reflective state is normally bright or normally dark. Thus, in its basic operation, the pixel cell may be digitally controlled to form either a dark pixel (for example, in a non-default reflective state) or a bright pixel (for example, in a default reflective state). In an analog drive scheme, on the other hand, the level of reflection or transmission from the spatial light modulator may be incrementally controlled by adjusting the applied voltage level.

In order to produce each of the primary colors from a display that uses a single spatial light modulator (also termed as imager or panel), a color wheel may be utilized. A color wheel typically is a segmented color filter wheel which rotates through an illumination beam produced by a light source. The color wheel has three or more pie-shaped regions consisting of color filters that transmit each of the primary colors. Thus, for example, as the color wheel rotates, it progressively forms a stripe of red across the entire spatial light modulator, then a stripe of green across the entire spatial light modulator, and then a stripe of blue across the entire structure. Thus, in a time multiplex fashion, the spatial light modulator progressively produces red, green, and blue images in the example just given, wherein the sequence is red, then green, then blue.

One problem with such an approach is that when red light is being transmitted to the spatial light modulator, green and blue light is being discarded. In such case, about two-thirds of the light intensity is effectively discarded. Necessarily, this means that brighter illumination sources are needed.

The reduced brightness efficiency of color wheel systems necessitates higher wattage lamps. Higher wattage lamps have shorter lifetimes and higher costs. As an example, currently, 100 Watt lamps reach about 10,000 hours of life, while 150 Watt lamps are limited to only about 6,000 hours of life. Thus, projection systems using a 150 Watt or higher lamp will require the consumer to change the light bulb. Usage of higher wattage lamps naturally also leads to more power consumption.

Thus, there is a need for better ways to more effectively use the available illumination.

BRIEF DESCRIPTION OF THE DRAWINGS

FIG. 3A is a cross-sectional view taken generally along the line I in FIG. 2 at one instance of time;

FIG. 3B is a cross-sectional view taken generally along the line II at a subsequent instance of time in accordance with one embodiment of the present invention;

FIG. 3C is a cross-sectional view taken generally along the line III at a subsequent instance of time in accordance with one embodiment of the present invention; and FIG. 4 is a graph of time versus distance on the front face of a spatial light modulator in accordance with one embodiment of the present invention as a result of the operation of the color wheel shown in FIG. 2.

DETAILED DESCRIPTION

Figure 1:
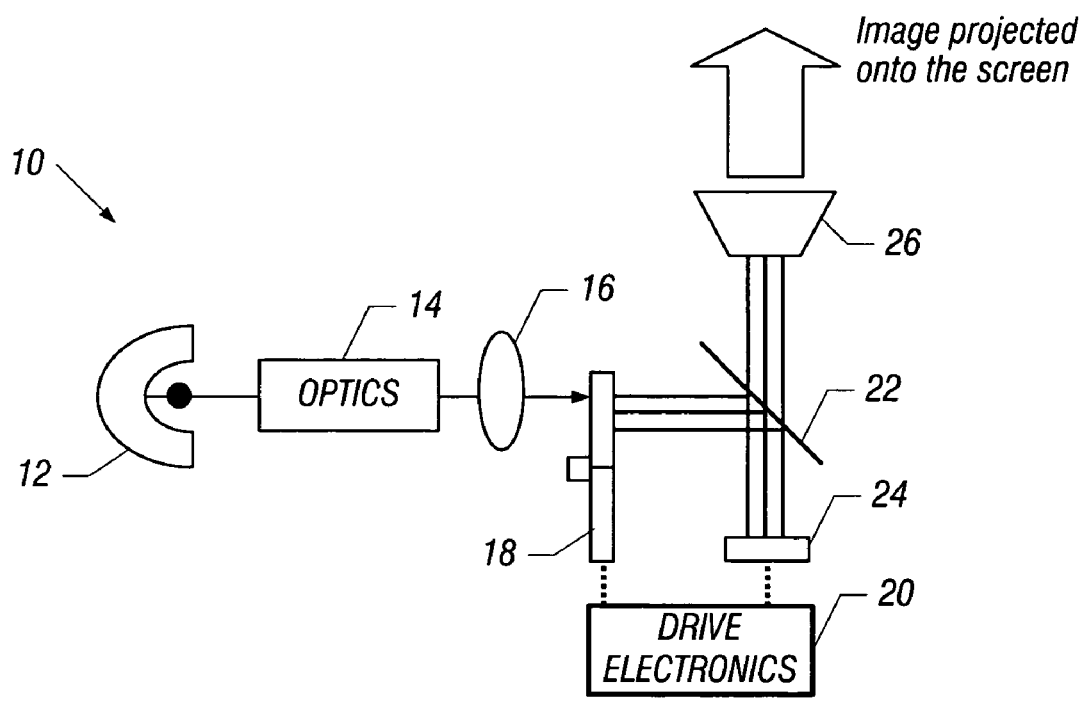
FIG. 1 is a schematic depiction of one embodiment of the present invention.

Referring to FIG. 1, a projection display 10, in accordance with an embodiment of the present invention, includes one or more spatial light modulators 24 (only one is shown in FIG. 1) that modulate impinging light to produce a projected composite, color optical image (herein called the projected image). The spatial light modulator 24 may be a liquid crystal on silicon (LCOS) spatial light modulator, a high-temperature polysilicon (HTPS) based liquid crystal display (LCD) spatial light modulator, a tilt-mirror spatial light modulator, or a microelectro-mechanical type spatial light modulator to mention a few examples.

In accordance with some embodiments, the projection display 10 includes a lamp 12, such as a high-pressure mercury lamp. The lamp 12 produces a broad visible spectrum illumination beam that passes through the optics 14 that may include an ultraviolet and infrared filter, and homogenizing optical elements. The light passing from the optics 14, in turn, passes through a lens 16 for beam shaping purposes. Then, the light impinges upon a rotating color wheel 18.

The color wheel 18 acts as a time-varying wavelength filter to allow certain wavelengths of light to pass at appropriate times. The filtered light from the color wheel 18 may be modulated by the spatial light modulator 24 to produce the projected image.

The projection display 10 is a shared color system in which the spatial light modulator modulates three different colors at any given time. For example, in one embodiment, the spatial light modulator may be divided into three rows or vertically displayed segments, each of which is exposed to light of a different primary color at any instance of time. Then, in time multiplex fashion, each of the rows is exposed to the other two primary colors.

In the projection display 10, the modulated beam is directed by the polarizing beam splitter 22 through projection lenses 26 to form the projected image. Thus, the light from the color wheel 18 is reflected downwardly to expose the spatial light modulator 24, while the light moving upwardly from the spatial light modulator 24 passes through the polarizing beam splitter 22 to the projection optics 26.

The spatial light modulator 24 may be a digital mirror device, a liquid crystal display, or any other pixilated spatial light modulator. In some embodiments, the spatial light modulator 24 is a liquid crystal-on-silicon device that includes a liquid crystal layer that is formed on a silicon substrate in which circuitry such as decoders, control circuits and registers, control and operate the device.

While a single spatial light modulator 24 is illustrated, multiple spatial light modulators may be utilized in other embodiments of the present invention. For example, as one alternative, each of the segments of differently colored light that are projected in a vertically stacked fashion may expose a different spatial light modulator.

The drive electronics 20 may include a programmable device such as a processor or microcontroller. The drive electronics 20 synchronize the field rate of the spatial light modulator 24 to the rotation speed of the color wheel 18. In addition, the drive electronics 20 may utilize a lookup table for purposes of storing the gray scale values that are utilized by the spatial light modulator to form the various images.

The pixel cells of the spatial light modulator 24 may be operated digitally in that each pixel cell, at any one time, is either in a reflective or a non-reflective state in one embodiment. Gray scale intensities may be achieved by pulse width modulation. Pulse width modulation is a technique that controls the optical behavior of the pixel cell during an interval of time called a duty cycle to control the intensity of the corresponding pixel of the projected image. The pulse width modulation control regulates the amount of time that a particular pixel cell is in its reflective and non-reflective states (in a reflective embodiment) for purposes of establishing its pixel intensity. The amount of time that the cell is in each state for a given pixel intensity is established by the lookup table in some embodiments.

Figure 2:
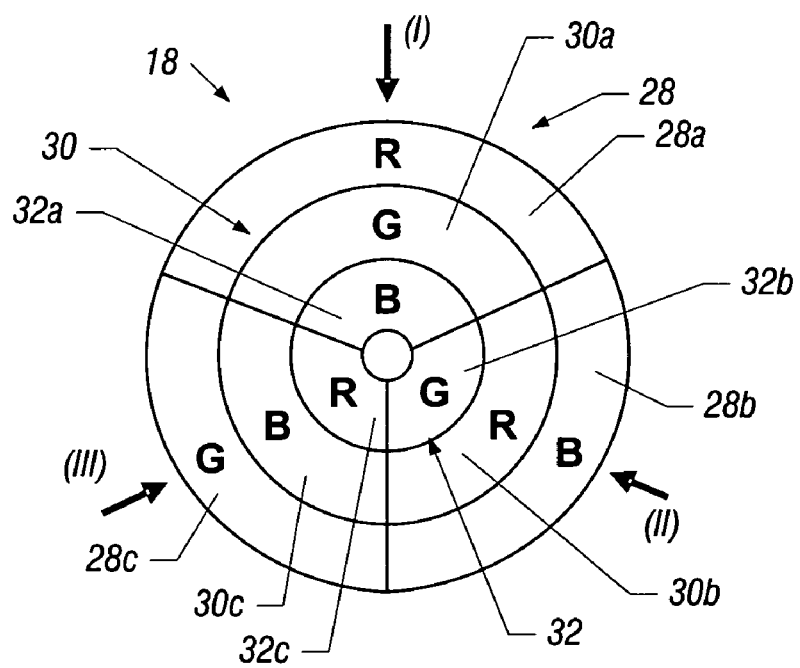
FIG. 2 is a front elevational view of the color wheel shown in FIG. 1 in accordance with one embodiment of the present invention.

Referring to FIG. 2, the color wheel 18 includes a set of three radially displaced regions 28, 30, and 32, that in one embodiment consist of dielectric thin-film filters positioned at about 45-degree angles to the direction of the incident light as illustrated in the next figure. In the radially central most region 32, a pie-shaped area is reserved for the transmission of each of the primary colors. Thus, in one embodiment, the pie-shaped area in sector I includes the blue transmitting region 32a, while sector II includes the green transmitting region 32b, and sector III includes the red transmitting region 32c. Moving radially outwardly, in the sector I, a concentric circular region 30 includes, successively, the green transmitting region 30a, the red transmitting region 30b, and the blue transmitting region 30c.

In the radially outermost circular region 28, the sector I includes the red transmitting region 28a, the sector II includes the blue transmitting region 28b, and the sector III includes the green transmitting region 28c. Other arrangements of the particular colors in the various sectors are within the scope of the present invention.

Thus, referring to FIG. 3A, when the white illumination beam illuminates the sector I, the color wheel 18 passes from top to bottom, red, then green, and finally blue color component of the incident white light.

When the sector II comes to the upper area, at a subsequent instance of time, indicated in FIG. 3B, the illumination beam projects blue, then red, and finally green stripes in vertically displaced fashion.

Finally, as indicated in FIG. 3C, during the operation of the sector III, the color wheel 18 produces a green stripe over a blue stripe, over a red stripe at a time interval subsequent to that indicated in FIGS. 3A and 3B.

As shown in FIG. 3, the angularly disposed color filters in each of the outer radial regions 28a, 28b, and 28c pass light of one color towards the polarizing beam splitter and reflect light of the other two primary colors downwardly (towards the center of the wheel). Each of the intermediate radial regions 30a, 30b, and 30c transmit light of one color towards the polarizing beam splitter and reflect light of the other color downwardly (towards the center of the wheel). Finally, each of the innermost radial regions 32a, 32b, and 32c reflect incident light outwardly towards the polarizing beam splitter. Thus, each of the regions 28, 30, and 32 amounts to an angularly oriented color filter or reflector. In some embodiments, the regions 28, 30, and 32 may be oriented at an angle to the plane of the color wheel 18, such as 45 degrees. Again, the regions 28c, 30c, and 32c may be angled filters that pass one color and reflect other colors downwardly. As a result, relatively little light is lost. This may enable the use of lower power light sources resulting in brighter display systems in some embodiments.

The net result of the regions 28-32 on the color wheel 18 is that the spatial light modulator 24 has an upper region 28a, which during sectors I's operation is red, an intermediate region 30a which is green during the operation of sector I, and a lower region 32a which is blue. At a subsequent instance of time, when the sector II of the color wheel 18 is aligned with the illumination beam, the blue sector 28b is created, followed by the red sector 30b being created, and then the green sector 32b is created at the bottom. Continuing in the same embodiment, during the sector III operation, the spatial light modulator has a green stripe 28c over a blue stripe 30c, over a red stripe 32c.

Thus, looking at FIG. 4, it is seen that in time sequential fashion, an uppermost stripe, in this embodiment, is exposed to red (28a), then blue (28b), then green (28c) during the time when an intermediate stripe is exposed to green (30a), then red (30b), then blue (30c), while a lowermost stripe is exposed to blue (32a), then green (32b), then red (32c).

While, in the embodiment illustrated, each of the regions 28-32 has equal lateral and vertical extents, other variations are possible as well. For example, the vertical extents of the various colors may be different to compensate for the way color is perceived by the human eye. For example, red may be largest, followed by green, while blue may have the smallest area in one embodiment. Similarly, the horizontal extent may be varied for similar or other reasons between the relative stripes. Also, the wheel shown in FIG. 2 has three sectors for illustration purposes only, in other embodiments a higher number of sectors may be used.

Color breakup artifacts may be reduced by rotating the color wheel 18 at sufficiently high speeds and/or increasing the number of sectors in the wheel. For example, at field rates of 1080 Hertz or greater color breakup artifacts may be significantly reduced.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

forming an image using a color wheel having radially displaced regions of different colors; and receiving in said color wheel a light beam including three primary colors, passing light of one color, and reflecting light of the other colors radially inwardly.

2. The method of claim 1 including forming an image using a color wheel also having circumferentially displaced regions of different colors.

3. The method of claim 2 including using a color wheel having three or more pie-shaped regions, each of said pie-shaped regions having radially displaced regions of different colors.

4. The method of claim 3 including using a color wheel having three or more circumferentially displaced pie-shaped regions, each of said pie-shaped regions including three radially displaced regions of three different colors.

5. The method of claim 4 including producing a first stripe having a sequence of three colors over a second stripe having a different sequence of three colors over a third stripe having still another sequence of three colors.

6. The method of claim 1 including forming said image using a spatial light modulator.

7. The method of claim 6 including projecting said image onto a projection screen.

8. The method of claim 7 including synchronizing the rotation of said color wheel to the spatial light modulator.

9. The method of claim 1 including using a color wheel to produce three different vertically displaced sequences of three primary colors.

10. The method of claim 9 including producing said sequence of colors without intervening unused areas.

11. The method of claim 1 including receiving said light of the other colors in said color wheel, passing light of one color, and reflecting light of the other color radially downwardly.

12. A color wheel comprising:
a circular surface having three radially displaced regions of different colors; and
said radially displaced regions including filters to pass light of one color and to reflect light of other colors radially inwardly.

13. The color wheel of claim 12 including three or more circumferentially displaced regions of different colors.

14. The color wheel of claim 13 wherein said circumferentially displaced regions are pie-shaped.

15. The color wheel of claim 14 wherein each of said pie-shaped regions have radially displaced regions of different colors.

16. The color wheel of claim 15 wherein said colors include the primary colors.

17. The color wheel of claim 12 including a first concentric region that includes regions of three different primary colors in sequence.

18. The color wheel of claim 17 including a second concentric region radially displaced inwardly from said first concentric region including regions of three different primary colors.

19. The color wheel of claim 18 including a third concentric region radially spaced inwardly from said second concentric region, said third concentric region including regions of three different colors.

20. The color wheel of claim 19 wherein each of said radially displaced regions contain color transmission and reflection filters that are disposed at an angle from the plane of said color wheel.

21. The color wheel of claim 12 wherein the color filter in an intermediate radially displaced region to receive the light of two colors reflected from said outer radial region passes light of one of said colors radially inwardly and to reflect light of another color outwardly.

22. The color wheel of claim 21 including a radially innermost region of said color wheel to receive light from said intermediate radially displaced region and reflect it outwardly.

23. A projection display comprising:
a color wheel including three radially displaced regions of different colors, said color wheel to pass light of one of three primary colors and reflect light of the other two primary colors radially inwardly; and
a spatial light modulator coupled to receive light from said color wheel.

24. The display of claim 23 including a lamp and a projection system.

25. The display of claim 23 wherein said color wheel includes three or more circumferentially displaced regions of different colors.

26. The display of claim 25 wherein said circumferentially displaced regions are pie-shaped.

27. The display of claim 26 wherein each of said pie-shaped regions have radially displaced regions of different colors.

28. The display of claim 27 wherein said colors include the primary colors.

29. The display of claim 23 wherein said color wheel includes three radially displaced regions that contain color transmission and reflection filters that are disposed at an angle from the plane of said color wheel, including an outermost radial region, an intermediate radial region, and an innermost radial region, said outermost radial region to pass light of one color and reflect light of other colors radially inwardly, said intermediate radial region to reflect light of one color and to pass light of another color, and said innermost radial region to reflect light.

30. The display of claim 29 wherein said angle is about 45°

31. The display of claim 23 including only one spatial light modulator panel.

32. The display of claim 29 wherein said spatial light modulator is one selected from the group of liquid crystal-on-silicon, high-temperature polysilicon liquid crystal display, or tilt-mirror spatial light modulators.

* * * * *